United States Patent [19]

Harpell et al.

[11] Patent Number: 4,584,347

[45] Date of Patent: Apr. 22, 1986

[54] MODIFIED POLYOLEFIN FIBER

[75] Inventors: Gary A. Harpell, Morristown; Sheldon Kavesh, Whippany; Igor Palley, Madison; Dusan C. Prevorsek, Morristown, all of N.J.

[73] Assignee: Allied Corporation, Morris Township, Morris County, N.J.

[21] Appl. No.: 597,283

[22] Filed: Apr. 6, 1984

Related U.S. Application Data

[62] Division of Ser. No. 430,577, Sep. 30, 1982, Pat. No. 4,455,273.

[51] Int. Cl.[4] .................. C08L 23/06; C08L 23/30; C08L 59/02; C08L 23/08
[52] U.S. Cl. .................. 525/119; 525/64; 525/70; 525/78; 525/57; 525/58; 525/120; 525/154; 525/170; 525/176; 525/177; 525/192; 525/196; 525/211; 525/221; 525/222; 525/227; 525/240
[58] Field of Search ............... 525/240, 931, 221, 211, 525/227, 154, 192, 119

[56] References Cited

U.S. PATENT DOCUMENTS

| | | | |
|---|---|---|---|
| 3,048,465 | 8/1962 | Jurgeleit | 18/54 |
| 3,210,452 | 10/1965 | Howard | 264/203 |
| 4,123,476 | 10/1978 | Bonnefon et al. | 525/240 |
| 4,260,565 | 4/1981 | D'Amico et al. | 525/931 |

FOREIGN PATENT DOCUMENTS

| | | |
|---|---|---|
| 0055001 | 6/1982 | European Pat. Off. |
| 0064167 | 11/1982 | European Pat. Off. |
| 2042414 | 9/1980 | United Kingdom |
| 2051667 | 1/1981 | United Kingdom |

Primary Examiner—Carman J. Seccuro
Attorney, Agent, or Firm—Gus T. Hampilos; Gerhard H. Fuchs

[57] ABSTRACT

Fibers prepared by spinning, drawing and drying dilute solutions of ultrahigh molecular weight polyethylene or polypropylene are modified by including in the dilute solution a polymeric additive. The polyethylene fibers so prepared have melting points above 140° C. and exhibit improved adherence to matrices, resistance to fibrillation and other advantageous properties. Additives include lower molecular weight polyolefins, oxidized polyolefins, olefin copolymers, polyolefin graft copolymers and polyoxymethylenes.

15 Claims, 1 Drawing Figure even when spun and quenched to form a gel fiber. In the Smith and Lemstra process, a volatile solvent (decalin) is used and the gel fiber is subsequently dried and stretched under defined conditions. In the Kavesh et al. process, the solvent is non-volatile (e.g. paraffin oil) and the gel fiber is extracted (e.g. with trichlorotrifluoroethane) before drying. Stretching occurs in one or more places throughout the process, and especially on the wet gel (prior to extraction) or on the dried gel or on both.
MODIFIED POLYOLEFIN FIBER This application is a division of application Ser. No. 430,577, filed 9/30/82, now U.S. Pat. No. 4,455,273.

CROSS-REFERENCE TO RELATED APPLICATIONS

This application is related to the following copending, commonly assigned U.S. Patent Applications filed Mar. 19, 1982:

1. Ser. No. 359,019, now Pat. No. 4,413,110 of Kavesh and Prevorsek entitled, "High Tenacity, High Modulus Polyethylene and Polypropylene Fibers and Intermediate Therefor";
2. Ser. No. 359,020, now abandoned, of Kavesh and Prevorsek entitled, "Producing High Tenacity, High Modulus Crystalline Temperature Article such as Fiber or Film";
3. Ser. No. 359,976, now abandoned, of Harpell, Kavesh, Palley and Prevorsek entitled, "Coated Extended Chain Polyolefin Fiber";
4. Ser. No. 359,974, now Pat. No. 4,501,856, of Harpell, Kavesh, Palley and Prevorsek entitled, "Composite Containing Polyolefin Fiber and Polyolefin Matrix";
5. Ser. No. 359,975, now Pat. No. 4,403,012, of Harpell, Kavesh, Palley and Prevorsek entitled, "Improved Ballistic-Resistant Article."

Also related is a commonly-assigned application of Kavesh, Prevorsek and Harpell entitled, "Fabrics Formed from Ultrahigh Tenacity and Modulus Fibers, and Methods of Heat-Shrinking and Heat-Setting" Ser. No. 429,942, filed herewith.

BACKGROUND OF THE INVENTION

The preparation of high performance polyolefin fibers by spinning solutions of ultrahigh molecular weight (UHMW) polyethylene (and in the Kavesh et al. applications polypropylene) to form gel fibers is described in the above application Ser. Nos. 359,019 and 359,020 and in British Published Application 2,051,667 and German Offen 3004699 of Smith and Lemstra. In all of these references, a hot solution of the UHMW polyolefin in a solvent (with a non-polymeric stabilizer) is spun and quenched to form a gel fiber. In the Smith and Lemstra process, a volatile solvent (decalin) is used and the gel fiber is subsequently dried and stretched under defined conditions. In the Kavesh et al. process, the solvent is non-volatile (e.g. paraffin oil) and the gel fiber is extracted (e.g. with trichlorotrifluoroethane) before drying. Stretching occurs in one or more places throughout the process, and especially on the wet gel (prior to extraction) or on the dried gel or on both.

In European Published Application 0055001 of Stamicarbon (June 30, 1982), fillers are incorporated in the polyethylene solution prior to spinning. Both filler fibers (e.g. gypsum fibers), filler globules (e.g. glass globules) and filler particles (e.g. Aerosil ® particles) are used. Certain other hydrocarbon polymers are included in the high molecular weight polyethylene described on page 5 of the reference, but the fillers described on pages 4 and 5 are essentially all inorganic materials or carbon, except for materials such as stearic acid coating the surface of reinforcing fillers such as calcium carbonate.

One preferred application for such high performance fibers is in composites. Especially when the matrix is a thermosetting resin such as an epoxy or unsaturated polyester molding compound, the polyolefin fiber itself is expected to exhibit poor adherence to the matrix. This adherence is improved in our U.S. Ser. No. 359,976 by coating the polyolefin fiber with an olefin polymer or copolymer such as low density polyethylene, ethylene acrylic acid copolymers and the like.

Other properties of the fiber which would desirably be improved for various applications include: resistance to fibrillation (e.g. in sutures and cordage), improved resistance to bending fatigue (e.g. in cordage and fabrics), moldability of the fiber itself (e.g. in composites, tents and sails), dyeability of the fiber (e.g. for textile applications) and antistatic properties (e.g. for textile applications).

BRIEF DESCRIPTION OF THE INVENTION

The present invention includes an improvement in either the Kavesh and Prevorsek or Smith and Lemstra processes based upon incorporation of a polymeric additive in defined amounts into the dilute solution which is spun. Accordingly, the invention includes a process of forming a high tenacity, high modulus polyethylene or polypropylene fiber, in which (a) a dilute solution of ultrahigh molecular weight polyethylene or polypropylene in a first solvent is spun and cooled to form a first gel fiber, (b) the gel fiber is extracted (if said first solvent is non-volatile) with a volatile solvent to form a second gel fiber, (c) the first gel fiber (if said first solvent is volatile) or the second gel fiber is dried to form a xerogel fiber and (d) at least one of the first gel fiber, the second gel fiber and the xerogel fiber is stretched; characterized by the dilute solution comprising the ultrahigh molecular weight polyethylene or polypropylene, the solvent and a polymeric additive selected from the group consisting of copolymers containing monoolefins as primary monomers, polyolefins of molecular weight not greater than 250,000 oxidized polyolefins, graft polyolefin copolymers, and polyoxymethylenes, with the weight of polymeric additive being at least 2% of the weight of ultrahigh molecular weight polyethylene or polypropylene, but not being sufficiently high to lower the main melting temperature of the fiber (by DSC in argon at 10° C./min) to below 140° C. in the case of polyethylene or to below 162° C. in the case of polypropylene.

The present invention also includes a similar improvement in the fibers produced by these prior art processes: a stretched fiber having tenacity at least 15 g/denier, tensile modulus at least 500 g/denier and main melting at least 140° C. (by DSC in argon at 10° C./min), comprising polyethylene of molecular weight at least about 500,000 and a polymeric additive selected from the group consisting of copolymers containing monoolefins as primary monomers, polyolefins of molecular weight not greater than 250,000, oxidized polyolefins, graft polyolefin copolymers, and polyoxymethylenes, with the weight of polymeric additive being at least 2% of the weight of the polyethylene.

The fibers are particularly useful in composites, and especially such composites with thermosetting (e.g., epoxy or unsaturated polyester) matrices.

DETAILED DESCRIPTION OF THE INVENTION

Figure 1:
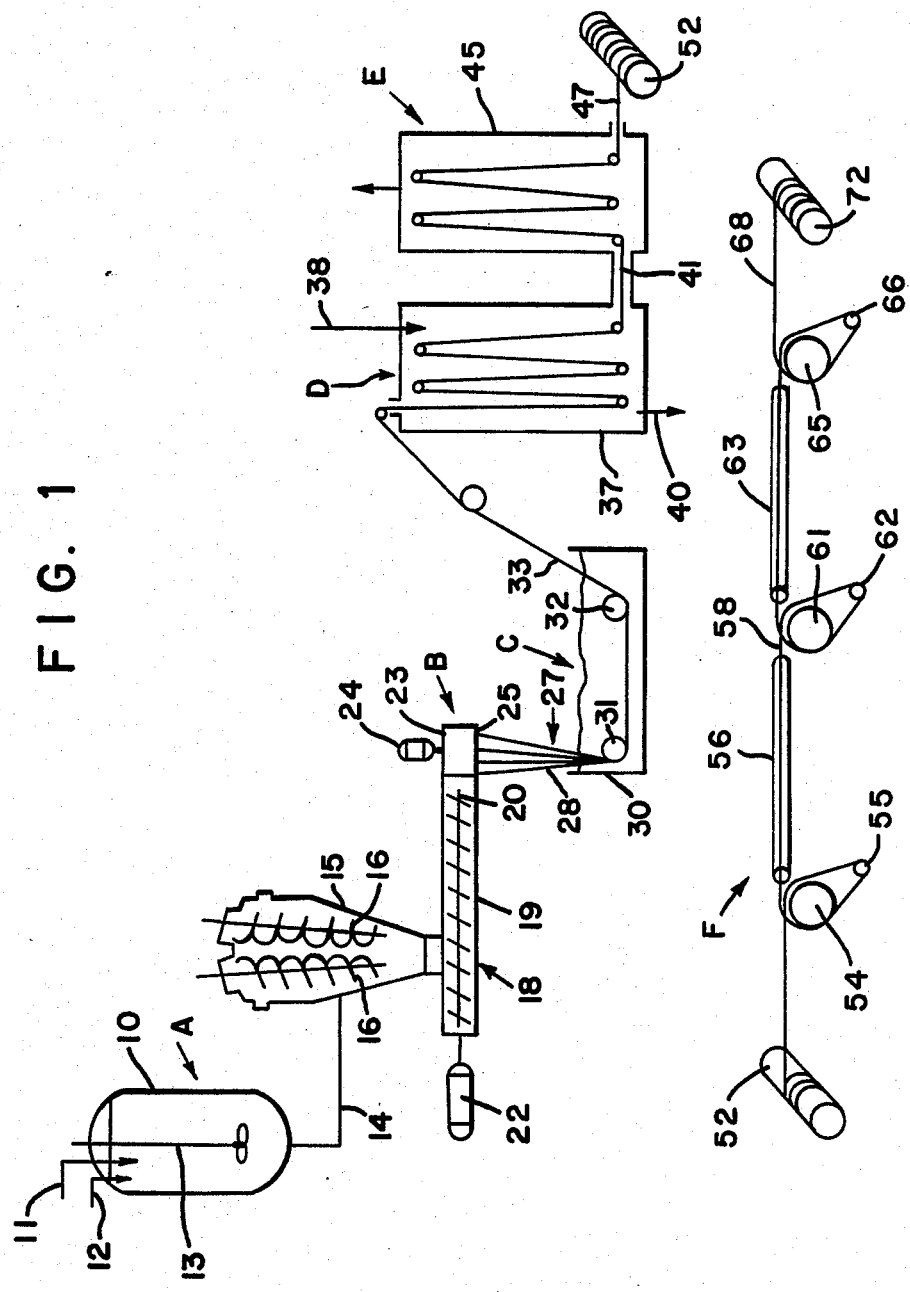

The solutions spun in the process of the present invention include ultrahigh molecular weight polyethylene or polypropylene, a solvent, the polymeric additive, and optionally other ingredients such as antioxidants, anti-ozonants, UV stabilizers, fillers or lubricants.

The weight average molecular weight of polyethylene used is at least 500,000 (6 IV), preferably at least 1,000,000 (10 IV), and more preferably between 2,000,000 (16 IV) and 8,000,000 (42 IV). The weight average molecular weight of polypropylene used is at least 750,000 (5 IV), preferably at least 1,000,000 (6 IV), more preferably at least 1,500,000 (9 IV) and most preferably between 2,000,000 (11 IV) and 8,000,000 (33 IV). The IV numbers represent intrinsic viscosity of the polymer in decalin at 135° C.

In preferred forms of the invention, following the procedures of Kavesh and Prevorsek, the first solvent should be non-volatile under the processing conditions. This is necessary in order to maintain essentially constant the concentration of solvent upstream and through the aperture (die) and to prevent non-uniformity in liquid content of the gel fiber or film containing first solvent. Preferably, the vapor pressure of the first solvent should be no more than 20 kPa (one-fifth of an atmosphere) at 175° C., or at the first temperature. Preferred first solvents for hydrocarbon polymers are aliphatic and aromatic hydrocarbons of the desired non-volatility and solubility for the polymer. The polymer may be present in the first solvent at a first concentration which is selected from a relatively narrow range, e.g. 2 to 15 weight percent, preferably 4 to 10 weight percent and more preferably 5 to 8 weight percent; however, once chosen, the concentration should not vary adjacent the die or otherwise prior to cooling to the second temperature. The concentration should also remain reasonably constant over time (i.e. length of the fiber or film).

In less preferred forms of the invention, a more volatile solvent such as decalin or dodecane is used. In such case some variation in concentration may occur through the die or on cooling since some solvent evaporation may occur. Such processes are described in UK Application Nos. 2,051,667 and 2,042,414.

The polymeric additives useful in the process and fibers of the present invention include four major classes: (1) polyolefins of molecular weight up to about 250,000, (2) copolymers with an olefin as the primary monomer (including graft copolymers and certain elastomers), (3) oxidized polyolefins and (4) polyoxymethylenes. These four groups and certain subgroups are discussed separately below, with the understanding that mixtures from different groups may also be used, and that the maximum total amounts contemplated are based on the general criterion of not lowering the fiber melting point below the values indicated above. The minimum total amount of 2% is intended to apply to the total of all polymeric additives.

Polyolefin additives useful in the present invention include all forms of polyethylene and polypropylene, including especially low density polyethylene (density 0.90-0.94 which includes linear low density polyethylene), high density polyethylene, polypropylene (preferably isotactic), polybutene-1 and other homopolymers. Also included in the polyolefin group are copolymers with minor amounts of higher olefins such as is generally sold under the homopolymer name (as for example copolymers with over 90% ethylene and under 10% of a higher olefin such as 1-butene or 1-hexene). Weight average molecular weights for the group of additives should normally not exceed about 250,000, so as to distinguish the additive from the ultrahigh molecular weight polyolefin used as the main component of the fiber. Unlike the primary component of the fiber, the additives of this group need not be highly linear; instead the polymeric additive may have long branches, a few short branches or many short branches. The preferred additives from this group will depend upon the property change desired, with (for example) additives used in fibers for composite applications (including rubber components) selected for adherence characteristics to the matrix. As shown in the examples, low density polyethylene is a preferred additive for many uses.

Copolymer additives useful in the present invention include those having one or more of ethylene, propylene or a higher monoolefin as the primary monomer (at least 50 mole percent) and various comonomers as discussed below.

Ethylene copolymers with one or more of acrylic acid, methacrylic acid, vinyl acetate, and other polar comonomers that can be directly copolymerized with ethylene by radical polymerization processes are included. Also included are derivatives of these copolymers where some or all of the comonomers have been subjected to a post-polymerization process, as in the methanolysis of some or all of the vinyl acetate residues to vinyl alcohol or the neutralization of some or all of the acrylic acid or methacrylic acid residues by metals such as sodium, zinc and the like (producing ionomers). Terpolymers such as ethylene-acrylic acid-vinyl acetate copolymers are included. The amount of such polar comonomers may vary from under 1% to the limits obtainable, and are typically 1-20 mol% for many comonomers. The polymer may be entirely blocked, completely or somewhat random, or any condition in between.

Also included are graft copolymers wherein a monomer such as acrylic acid, methacrylic acid, vinyl acetate or styrene is grafted onto a pre-formed polyolefin or copolymer. Especially suitable in this group are acrylic acid grafted or styrene grafted polyethylene.

Copolymers of polyolefins are included to the extent not included in the first group (i.e. copolymers with monomer amounts of higher olefin comonomer). These include both crystalline copolymers showing a high degree of ethylene crystallinity and amorphous or rubbery copolymers represented by the EPM and EPDM rubbers discussed below. Any such EPM or EPDM rubbers as described in the article "Ethylene/Propylene Rubber" by E. L. Borg at pages 220–248 (Chapter 9) of M. Morton, *Rubber Technology* (Second Edition 1973) may be used. The EPM rubbers are amorphous copolymers of ethylene and propylene having, typically 50-75 percent ethylene, by weight. The EPDM rubbers are terpolymers with dienes such as 1,4-hexadiene, dicyclopentadiene (DCPD), methylene norbornene, ethylidene norbornene (ENB) and similar dienes having one double bond active for polymerization (e.g. the terminal double bond of 1,4-hexadiene) and one double bond relatively inert during polymerization which forms a pendant site for curing or cross-linking (e.g. the non-terminal bond of 1,4-hexadiene).

Oxidized polyolefins useful as additives in the present invention include polyethylene (of any density or molecular weight) subjected to degradative treatment with oxygen, ozone or other oxidizing agents, and especially to solid-state air oxidation as described in U.S. Pat. No. 3,322,711 to Bush et al. (1967).

Polyoxymethylenes useful as additives in the present invention include homopolymers of formaldehyde with long $(CH_2O)_n$ chains such as formed by the polymerization of trioxane and copolymers of formaldehyde with ethylene oxide having $(CH_2O)$ and $(CH_2CH_2O)$ residues (either randomly or non-randomly distributed) such as formed by the copolymerization of trioxane and dioxane. Other homopolymers and copolymers with other comonomers such as tetrahydrofuran are also contemplated.

When the UHMW base polymer is polyethylene, the fiber (or film) main melting point is at least about 140° C., preferably at least about 142° C. and more preferably at least about 145° C. These melting points represent reductions of generally less than 10° C. compared to the fibers of Kavesh et al. Ser. Nos. 359,019 and 359,020 and the lower-melting fibers of Smith & Lemstra (see their publication in *J. Mat. Sci.*, 15, 505 (1980). In some cases, such as Examples 1-11, below, the analysis of the fiber by DSC at 10° C./minute reveals no separate melting point attributable to the polymer additive. In another case, as represented by Example 12 below, a separate (generally lower) melting point is seen. For most additives, higher amounts of additives will show the separate melting temperature, but lower amounts will not. For some applications, fibers (or films) showing no separate melting temperatures are preferred because, in general, the mechanical properties of the fiber itself are likely to be superior. For other applications, the presence of what appears to be a more highly-developed separate additive-rich phase (probably most prevalent on the fiber surface) may be preferred, such that a separate melting temperature by DSC is evidence of a preferred fiber (or film).

In addition to the polymeric additive, other materials may also be present in the solution, such as antioxidants used to retard polymer oxidation at the high solution and processing temperatures. Fillers and other additives which do not dissolve (such as are described in European Published Application 0055001) are permitted, but not preferred.

The first temperature is chosen to achieve complete dissolution of the polymer in the first solvent. The first temperature is the minimum temperature at any point between where the solution is formed and the die face, and must be greater than the gelation temperature for the polymer in the solvent at the first concentration. For polyethylene in paraffin oil at 5–15% concentration, the gelation temperature is approximately 100°–130° C.; therefore, a preferred first temperature can be between 180° C. and 250° C., more preferably 200°–240° C. While temperatures may vary above the first temperature at various points upstream of the die face, excessive temperatures causative of polymer degradation should be avoided. To assure complete solubility, a first temperature is chosen whereat the solubility of the polymer exceeds the first concentration, and is typically at least 100% greater. The second temperature is chosen whereat the solubility of the polymer is much less than the first concentration. Preferably, the solubility of the polymer in the first solvent at the second temperature is no more than 1% of the first concentration. Cooling of the extruded polymer solution from the first temperature to the second temperature should be accomplished at a rate sufficiently rapid to form a gel fiber which is of substantially the same polymer concentration as existed in the polymer solution. Preferably the rate at which the extruded polymer solution is cooled from the first temperature to the second temperature should be at least 50° C. per minute.

Some stretching during cooling to the second temperature is not excluded from the present invention, but the total stretching during this stage should not normally exceed 10:1. As a result of those factors the gel fiber formed upon cooling to the second temperature consists of a continuous polymeric network highly swollen with solvent. The gel usually has regions of high and low polymer density on a microscopic level but is generally free of large (greater than 500 nm) regions void of solid polymer.

If an aperture of circular cross section (or other cross section without a major axis in the plane perpendicular to the flow direction more than 8 times the smallest axis in the same plane, such as oval, Y- or X-shaped aperture) is used, then both gels will be gel fibers, the xerogel will be an xerogel fiber and the thermoplastic article will be a fiber. The diameter of the aperture is not critical, with representative apertures being between 0.25 mm and 5 mm in diameter (or other major axis). The length of the aperture in the flow direction should normally be at least 10 times the diameter of the aperture (or other similar major axis), perferably at least 15 times and more preferably at least 20 times the diameter (or other similar major axis).

If an aperture of rectangular cross section is used, then both gels will be gel films, the xerogel will be a xerogel film and the thermoplastic article will be a film. The width and height of the aperture are not critical, with representative apertures being between 2.5 mm and 2 m in width (corresponding to film width), between 0.25 mm and 5 mm in height (corresponding to film thickness). The depth of the aperture (in the flow direction) should normally be at least 10 times the height of the aperture, preferably at least 15 times the height and more preferably at least 20 times the height.

The extraction with second solvent is conducted in a manner that replaces the first solvent in the gel with second solvent without significant changes in gel structure. Some swelling or shrinkage of the gel may occur, but preferably no substantial dissolution, coagulation or precipitation of the polymer occurs.

When the first solvent is a hydrocarbon, suitable second solvents include hydrocarbons, chlorinated hydrocarbons, chlorofluorinated hydrocarbons and others, such as pentane, hexane, heptane, toluene, methylene chloride, carbon tetrachloride, trichlorotrifluoroethane (TCTFE), diethyl ether and dioxane.

The most preferred second solvents are methylene chloride (B.P. 39.8° C.) and TCTFE (B.P. 47.5° C.). Preferred second solvents are the non-flammable volatile solvents having an atmospheric boiling point below 80° C., more preferably below 70° C. and most preferably below 50° C. Conditions of extraction should remove the first solvent to less than 1% of the total solvent in the gel.

A preferred combination of conditions is a first temperature between 150° C. and 250° C., a second temperature between −40° C. and 40° C. and a cooling rate between the first temperature and the second temperature of at least 50° C./minute. It is preferred that the first solvent be a hydrocarbon, when the polymer is a polyolefin such as ultrahigh molecular weight polyethylene. The first solvent should be substantially non-volatile, one measure of which is that its vapor pressure at the first temperature should be less than one-fifth atmosphere (20 kPa), and more preferably less than 2 kPa.

In choosing the first and second solvents, the primary desired difference relates to volatility as discussed above. It is also preferred that the polymers be less soluble in the second solvent at 40° C. than in the first solvent at 150° C.

Once the gel containing second solvent is formed, it is then dried under conditions where the second solvent is removed leaving the solid network of polymer substantially intact. By analogy to silica gels, the resultant material is called herein a "xerogel" meaning a solid matrix corresponding to the solid matrix of a wet gel, with the liquid replaced by gas (e.g. by an inert gas such as nitrogen or by air). The term "xerogel" is not intended to delineate any particular type of surface area, porosity or pore size.

In the less preferred processes employing a volatile first solvent, the removal of first solvent may be conducted in one or more stages: during spinning, during stretching and in a separate drying step. Furthermore, some or all of the volatile first solvent may be extracted out of the fiber using a relatively more volatile second solvent, as described above in relation to the preferred processes.

Stretching may be performed upon the gel fiber after cooling to the second temperature or during or after extraction. Alternatively, stretching of the xerogel fiber may be conducted, or a combination of gel stretch and xerogel stretch may be performed. The stretching may be conducted in a single stage or it may be conducted in two or more stages. The first stage stretching may be conducted at room temperatures or at an elevated temperature. Preferably the stretching is conducted in two or more stages with the last of the stages performed at a temperature between 120° C. and 160° C. Most preferably the stretching is conducted in at least two stages with the last of the stages performed at a temperature between 135° C. and 150° C. The Examples A, B and 1–19, illustrate how the stretch ratios can be related to obtaining particular fiber properties.

The properties of the product fibers (compared to similar fibers prepared without polymeric additives) are expected to improve their usefulness in a variety of applications, with certain additives being appropriate or preferred for certain applications. Elastomeric additives (among others) are expected to reduce fibrillation of the fibers themselves and improves resistance to bending fatigue. Copolymer additives (especially with polar comonomers) are expected to improve the antistatic properties of textiles prepared from the fibers. Various additives of melting point lower than the base UHMW polymer are expected to make the fibers adhere more strongly to themselves and other similar materials. EPDM additives, especially, are expected to provide cross-linkable groups on the surface of the fiber for chemical bonding to various materials including polymeric matrices.

One especially preferred use for the present fibers is in composites. Just as described in the above-referenced application Ser. Nos. 359,976 and 359,974, a network of the present fibers (continuous or staple) may be used with various matrices including all types of polymeric matrices (thermoplastic, thermosetting and elastomeric) and in non-polymeric matrices such as concrete or plaster of Paris. Representative pairings of representative matrices with suitable polymeric additives are indicated in the following Table:

| Matrix | Polymeric Additive in UHMW Polyethylene Fiber |
|---|---|
| (A) Thermoplastic | |
| HD Polyethylene | HD Polyethylene |
| LD Polyethylene | LD Polyethylene |
| Ethylene-acrylic acid copolymer | Ethylene-acrylic acid polymer |
| Poly(methyl methacrylic) | Ethylene-acrylic acid polymer |
| Polystyrene | Ethylene-styrene graft |
| (B) Thermosetting | |
| Unsaturated Polyester | EAA Copolymer |
| Unsaturated Polyester | Na—EAA Ionomer |
| Unsaturated Polyester | Ethylene-vinyl alcohol copolymer |
| Unsaturated Polyester | LD Polyethylene |
| Unsaturated Polyester | HD Polyethylene-graft acrylic acid |
| Epoxy Resin | Ethylene-acrylic acid copolymer |
| Polyurethane | Ethylene-vinyl alcohol copolymer |
| (C) Elastomeric Matrices | |
| EPDM Rubber* | EPDM Rubber |
| EPDM Rubber* | LD Polyethylene |
| EPM Rubber* | EPM |
| EPM Rubber* | HD Polyethylene-graft EPM rubber |
| SBR Rubber* | Polyethylene-styrene graft |
| SBR Rubber* | HD Polyethylene-graft polybutadiene |
| SBR Rubber* | HD Polyethylene-graft SBR |
| Polyurethane* | Ethylene-vinyl alcohol copolymer |
| (D) Non-polymeric Matrices | |
| Concrete | Ethylene-acrylic acid copolymer |
| Concrete | Na—EAA Ionomer |
| Concrete | Ethylene-methacrylic copolymer |
| Plaster of Paris | Ethylene-acrylic acid copolymer |

* = in the starred composites, the cross-linking of the matrix with conventional vulcanizing agents after the composite is formed is expected to improve adherence of the fibers.

DESCRIPTION OF THE PREFERRED EMBODIMENT

FIG. 1 illustrates in schematic form a first embodiment of the present invention, wherein the stretching step F is conducted in two stages on the xerogel fiber subsequent to drying step E. In FIG. 1, a first mixing vessel 10 is shown, which is fed with an ultra high molecular weight polymer 11 such as polyethylene of weight average molecular weight at least 500,000 and preferably at least 1,000,000, and to which is also fed a first, relatively non-volatile solvent 12 such as paraffin oil. In the present invention, there is further fed to the mixing vessel 10 a polymeric additive 17 which can be an ethylene-acrylic acid copolymer, a low density, lower molecular weight polyethylene or any of the various other polymeric additives described above. First mixing vessel 10 is equipped with an agitator 13. The residence time of UHMW polymer, polymeric additive and first solvent in first mixing vessel 10 is sufficient to form a slurry containing some dissolved polymer and some relatively finely divided polymer particles, which slurry is removed in line 14 to an intensive mixing vessel 15. Intensive mixing vessel 15 is equipped with helical agitator blades 16. The residence time and agitator speed in intensive mixing vessel 15 is sufficient to convert the slurry into a solution. It will be appreciated that the temperature in intensive mixing vessel 15, either because of external heating, heating of the slurry 14, heat generated by the intensive mixing, or a combination of the above is sufficiently high (e.g. 200° C.) to permit the polymer to be completely dissolved in the solvent at the desired concentration (generally between 6 and 10 percent UHMW polymer, by weight of solution). From the intensive mixing vessel 15, the solution is fed to an extrusion device 18, containing a barrel 19 within which is a screw 20 operated by motor 22 to deliver polymer solution at reasonably high pressure to a gear pump and housing 23 at a controlled flow rate. A motor 24 is provided to drive gear pump 23 and extrude the polymer solution, still hot, through a spinnerette 25 comprising a plurality of apertures, which may be circular, X-shaped, or oval-shaped, or in any of a variety of shapes having a relatively small major axis in the plane of the spinnerette when it is desired to form fibers, and having a rectangular or other shape with an extended major axis in the plane of the spinnerette when it is desired to form films. The temperature of the solution in the mixing vessel 15, in the extrusion device 18 and at the spinnerette 25 should all equal or exceed a first temperature (e.g. 200° C.) chosen to exceed the gellation temperature (approximately 100°–130° C. for polyethylene in paraffin oil). The temperature may vary (e.g. 220° C., 210° C. and 200° C.) or may be constant (e.g. 220° C.) from the mixing vessel 14 to extrusion device 18 to the spinnerette 25. At all points, however, the concentration of polymer in the solution should be substantially the same. The number of aperatures, and thus the number of fibers formed, is not critical, with convenient numbers of apertures being 16, 120, or 240.

From the spinnerette 25, the polymer solution passes through an air gap 27, optionally enclosed and filled with an inert gas such as nitrogen, and optionally provided with a flow of gas to facilitate cooling. A plurality of gel fibers 28 containing first solvent pass through the air gap 27 and into a quench bath 30, so as to cool the fibers, both in the air gap 27 and in the quench bath 30, to a second temperature at which the solubility of the polymer in the first solvent is relatively low, such that most of the polymer precipitates as a gel material. While some stretching in the air gap 27 is permissible, it is preferably less than 10:1, and is more preferably much lower.

It is preferred that the quench liquid in quench bath 30 be water. While the second solvent may be used as the quench fluid (and quench bath 30 may even be integral with solvent extraction device 37 described below), it has been found in limited testing that such a modification impairs fiber properties.

Rollers 31 and 32 in the quench bath 30 operate to feed the fiber through the quench bath, and preferably operate with little or no stretch. In the event that some stretching does occur across rollers 31 and 32, some first solvent exudes out of the fibers and can be collected as a top layer in quench bath 30.

From the quench bath 30, the cool first gel fibers 33 pass to a solvent extraction device 37 where a second solvent, being of relatively low boiling such as trichlorotrifluoroethane, is fed in through line 38. The solvent outflow in line 40 contains second solvent and essentially all of the first solvent brought in with the cool gel fibers 33, either dissolved or dispersed in the second solvent. Thus the second gel fibers 41 conducted out of the solvent extraction device 37 contain substantially only second solvent, and relatively little first solvent.

The second gel fibers 41 may have shrunken somewhat compared to the first gel fibers 33, but otherwise contain substantially the same polymer morphology.

In a drying device 45, the second solvent is evaporated from the second gel fibers 41 forming essentially unstretched xerogel fibers 47 which are taken up on spool 52.

From spool 52, or from a plurality of such spools if it is desired to operate the stretching line at a slower feed rate than the take up of spool 52 permits, the fibers are fed over driven feed roll 54 and idler roll 55 into a first heated tube 56, which may be rectangular, cylindrical or other convenient shape. Sufficient heat is applied to the tube 56 to cause the internal temperature to be between 120° and 140° C. The fibers are stretched at a relatively high draw ratio (e.g. 10:1) so as to form partially stretched fibers 58 taken up by driven roll 61 and idler roll 62. From rolls 61 and 62, the fibers are taken through a second heated tube 63, heated so as to be at somewhat higher temperature, e.g. 130°–160° C. and are then taken up by driven take-up roll 65 and idler roll 66, operating at a speed suficient to impart a stretch ratio in heated tube 63 as desired, e.g. 2.5:1. The twice stretched fibers 68 produced in this first embodiment are taken up on take-up spool 72.

With reference to the six process steps of the present invention, it can be seen that the solution forming step A is conducted in mixers 13 and 15. The extruding step B is conducted with device 18 and 23, and especially through spinnerette 25. The cooling step C is conducted in airgap 27 and quench bath 30. Extraction step D is conducted in solvent extraction device 37. The drying step E is conducted in drying device 45. The stretching step F is conducted in elements 52-72, and especially in heated tubes 56 and 63. It will be appreciated, however, that various other parts of the system may also perform some stretching, even at temperatures substantially below thase of heated tubes 56 and 63. Thus, for example, some stretching (e.g. 2:1) may occur within quench bath 30, within solvent extraction device 37, within drying device 45 or between solvent extraction device 37 and drying device 45.

Except for the presence of polymeric additive introduced in stream 17, the above embodiment of FIG. 1 corresponds to the first embodiment (FIG. 5) of Ser. No. 359,020. Variations in said first embodiment are taught in Ser. No. 359,020 with reference to FIGS. 6 and 7 thereof. The principal modifications from the first embodiment relates to where in the process stretching is performed. In the second embodiment, the cool first gel fiber 33 is stretched once prior to extraction and drying. The once-stretched extracted and dried fiber is stretched a second time at the end of the process. In the third embodiment, the cool first gel fibers 33 are subjected to two stretching steps prior to extraction and drying. The twice-stretched gel fiber is then extracted and dried. Both embodiments, as summarized above and described in more detail in the descriptions of FIGS. 6 and 7 in Ser. No. 359,020 (incorporated herein by reference), are contemplated for the cool gel fiber 33 of the present invention containing the polymeric additive of stream 17.

EXAMPLES 1–12 AND COMPARATIVE
EXAMPLES A AND B

Following the general procedures of Examples 540–542 of U.S. Ser. Nos. 359,019 and 359,020 of Kavesh and Prevorsek, multifilament fibers were spun from 6 weight percent solutions of ultrahigh molecular weight polyethylene in paraffin oil (having an inherent viscosity of 23 in decalin at 135° C., or a weight average molecular weight of about 6 million). Unlike the examples of that application, the present examples had various amounts of polymeric additions (generally 3–30%, by weight) in the solutions as well. The identifications and amounts of the additive in such Example are indicated in Table 1. All solutions were prepared at 220° C. in a Helicone ® mixer. Spinning was carried out at 220° C. using a 16 filament die with 0.75 mm hole diameter and 22.5 mm hole length. The spinning rate was 1 cm³/min-filament and the die draw ratio was 1.1:1. The fibers were quenched in a water bath located three inches (6.75 cm) from the die. The gel fibers were then stretched 2:1 in-line at room temperature and then at the indicated stretch ratios at 120° C. and 150° C. for the indicated total stretch ratios. Sixteen filament yarns were combined prior to the 120° C. stretch to achieve the indicated number.

TABLE 1

| Ex. | Additive | Level | Stretch 120° C. | Stretch 150° C. | Overall | Filament No. | Denier/Fil |
|---|---|---|---|---|---|---|---|
| A | — | 0 | 8.3 | 1.5 | 25 | 32 | 7.3 |
| B | — | 0 | 6.45 | 2.25 | 29 | 64 | 6.0 |
| 1 | EAA5.5 | 3% | 8 | 1.75 | 28 | 16 | 6.2 |
| 2 | EAA5.5 | 3% | 6.5 | 2.0 | 26 | 32 | 7.5 |
| 3 | EAA5.5 | 3% | 11.2 | 2.25 | 50 | 32 | 6.8 |
| 4 | EAA5.5 | 10% | 7.4 | 2.0 | 30 | 32 | 12.2 |
| 5 | LDPE | 10% | 7.25 | 2.0 | 29 | 128 | 5.5 |
| 6 | LDPE | 10% | 7.25 | 2.0 | 29 | 96 | 5.8 |
| 7 | LDPE | 10% | 7.25 | 2.0 | 29 | 16 | 11.8 |
| 8 | LDPE | 10% | 7.25 | 2.0 | 29 | 16 | 9.8 |
| 9 | EAA9.0 | 10% | 7.25 | 2.0 | 29 | 32 | 6.1 |
| 10 | EAA9.0 | 10% | 7.25 | 2.25 | 35 | 48 | 6.0 |
| 11 | EAA9.0 | 10% | 7.75 | 2.0 | 31 | 80 | 6.4 |
| 12 | EAA5.5 | 30% | 5.0 | 1.9 | 22 | 80 | 9.5 |
| 13 | EAA5.5 | 30% | 5.0 | 1.9 | 19 | 64 | 9.1 |
| 14 | EAA5.5 | 30% | 5.0 | 2.25 | 22 | 48 | 10.1 |
| 15 | EAA5.5 | 30% | 7.25 | 1.75 | 25 | 16 | 7.9 |
| 16 | EAA5.5 | 30% | 7.25 | 2.0 | 29 | 16 | 7.0 |
| 17 | EAA5.5 | 30% | 7.25 | 2 | 29 | 80 | 7.7 |
| 18 | EAA5.5 | 10% | 7.4 | 2 | 30 | 32 | 10.2 |
| 19 | EAA5.5 | 10% | 7.4 | 2 | 30 | 32 | 11.6 |

EAA5.5 = an ethylene-acrylic acid copolymer having 5.5% acrylic acid on a weight basis (sold by Dow Chemical Company as EAA-455).
LDPE = a low density polyethylene (sold by Dow Chemical as PE122) having a melt index of 0.25 dg/min and a density of 920 kg/m³.
EAA9.0 = an ethylene acrylic acid copolymer having 9.0 weight percent acrylic acid.

The twenty-one fibers so produced were then tested for mechanical properties (tensile strength and tensile modulus on an Instron tensile testing machine) and, in some instances, for melting point by DSC at 10° C./min in argon. The results are displayed in Table 2.

TABLE 2

| Ex. | Additive | Level | Tenacity | Modulus | MP |
|---|---|---|---|---|---|
| A | — | 0 | 28 | 1800 | 149 |
| B | — | 0 | 30 | 1600 | — |
| 1 | EAA5.5 | 3% | 31 | 1970 | — |
| 2 | EAA5.5 | 3% | 29 | 1630 | — |
| 3 | EAA5.5 | 3% | 29 | 1770 | 145 |
| 4 | EAA5.5 | 10% | 30 | 1420 | 146 |
| 5 | LDPE | 10% | 30 | 1340 | — |
| 6 | LDPE | 10% | 32 | 1380 | 144 |
| 7 | LDPE | 10% | 29 | 1480 | — |
| 8 | LDPE | 10% | 33 | 1640 | — |
| 9 | EAA9.0 | 10% | 31 | 1480 | 146 |
| 10 | EAA9.0 | 10% | 28 | 1280 | — |
| 11 | EAA9.0 | 10% | 33 | 1320 | — |
| 12 | EAA5.5 | 30% | 17 | 710 | 143* |
| 13 | EAA5.5 | 30% | 20 | 730 | — |

TABLE 2-continued

| Ex. | Additive | Level | Tenacity | Modulus | MP |
|---|---|---|---|---|---|
| 14 | EAA5.5 | 30% | 20 | 720 | — |
| 15 | EAA5.5 | 30% | 25 | 1150 | — |
| 16 | EAA5.5 | 30% | 25 | 1260 | — |
| 17 | EAA5.5 | 30% | 27 | 1040 | — |
| 18 | EAA5.5 | 10% | 29 | 1400 | — |
| 19 | EAA5.5 | 10% | 32 | 1560 | — |

*lower melting peak at 95° C. was observed.

EXAMPLE 20

Samples of the fibers of Examples 4, 6, 11 and 12 (7.9 mm in length) were heated (without stress or strain) at a heating rate of 10° C./min in a PERKIN ELMER TMS-1 Thermal Mechanical Analyzer up to 120° C. or 140° C. By continuously measuring the fiber length, a percent shrinkage was determined:

| Example | Shrinkage at 120° C. | Shrinkage at 140° C. |
|---|---|---|
| 4 | 0.4 | 1.8 |
| 6 | 0.4 | 2.5 |
| 11 | 0.4 | 2.4 |
| 12 | 0.6 | 5.7 |

EXAMPLE 21

The fiber of Example 12 (12.5 g) was wrapped cross-ply around a 3 inch by 3 inch (7.62 cm by 7.62 cm) metallic (Apollo) plate. The wound plate was charged into a cold mold and the mold heated to 135° C. and kept at 135° C. under a pressure of 2,200 psi (or 1.52 MPa pressure) for 5 minutes. Two composite plaques with good structural integrity were cut from the plate (one from each side).

EXAMPLE 22

The procedure of Example 21 was repeated using 12.3 g of the fiber of Example 5. Again two composite plaques with good structural integrity were prepared. A similar procedure at 135° C. with unmodified UHMW polyethylene fiber prepared in accordance with Kavesh & Prevorsek did not consolidate.

EXAMPLE 23

A series of tests implementing a sandwich beam structure were made using a 2 inch by one-quarter inch by three-thirty seconds inch (5.01 cm×0.653 cm×0.238 cm) nominal size test piece with an one-sixteenth inch (1.59 mm) thick epoxy core, a filament winding in the direction of beam length (0.1 g of fiber for each test) and an epoxy overcoat. The epoxy used was EPON ®/TETA. Flex span was 1.5 inch (3.81 cm). In all of the tests using the fibers of the present invention, failure occurred by fiber break at the side of the extension (as occurs with polyaramide or glass fiber reinforcements). In the test run with unmodified UHMW polyethylene fiber, failure occurred consistently by delamination. Absolute values of the force at failure are shown in Table 3.

TABLE 3

| Fiber | Force Applied Pounds (kg) | | Mode of Failure |
|---|---|---|---|
| of Example 5 | 40.7 | 18.48 | Fiber Break |
| of Example 6 | 40.4 | 18.34 | " |
| of Example 12 | 38.1 | 17.30 | " |
| KEVLAR ® 29 poly- | 41.5 | 18.84 | " |

TABLE 3-continued

| Fiber | Force Applied Pounds (kg) | | Mode of Failure |
|---|---|---|---|
| aramid UHMW Fiber* | 35.7 | 16.21 | Delamination |

*Similar to A and B, above, except the stretch ratios were 2:1 (in-line at room temperature), 6:1 (at 120° C.) and 2.25:1 (at 150° C.), producing a 32-filament, 283-denier fiber with 29 g/denier tenacity and 1220 g/denier modulus.

EXAMPLE 24

Following the procedures of ASTM D2344-76, the short beam shear strength of specimens, one half by one quarter by one-eight inch (12.7 mm by 6.35 mm by 3.17 mm) with a matrix of EPON/TETA and fibers on one side and glass fibers on the other side (the compressive side to avoid compressive failure). By volume, the composites were 40% matrix, 40% polyethylene fibers and 20% glass fibers. Using the fibers of Example 21, the shear strength was 3.27 kpsi (22.54 MPa). Using the fibers of Example 19, the shear strength was 3.04 kpsi (20.36 MPa). Using the fibers of Example 12, the shear strength was 2.43 kpsi (16.75 MPa). Using unmodified UHMW polyethylene fibers (similar to fibers A and B, but with a tensile strength of 32 g/denier and a tensile modulus of 1380 g/denier), the shear strength was 1.04 kpsi (7.17 MPa).

The following example illustrates the improved resistance to bending fatigue of one of the fibers of the invention.

EXAMPLE 25

The relationship between single fiber flex life and stress was determined for fibers taken from the two yarn samples designated comparative Example B and Example 6 above. A sufficient length of ten single filaments were withdrawn from each yarn sample to conduct flex life tests on each filament at each of three different loads.

The flex life test has been described briefly by R. E. Wilfong and J. Zimmerman in *J. Appl. Poly. Sci.*, 31, 16 (1977). Ten individual fibers withdrawn from the yarn sample were measured to determine their deniers. The ten fibers were then affixed at their tops to a common rotatable arm. A weight was attached to the bottom of each fiber about 2 inches below the point of support. (The same weight was used with each fiber). The hanging weights created a tensile stress on the fibers during the flex testing.

In operation the fiber support arm was driven by a cam mechanism that caused it to rotate 90° in one direction and then to reverse and rotate 90° in the other direction.

This caused each suspended fiber sample to be cyclically bent 90° about a horizontal steel wire of 0.020" diameter and then unbent. The number of cycles of flexing which each fiber survived without breaking under the applied tensile stress was recorded by an electrical totalizing system.

The raw data, consisting of measurements of individual fiber deniers and flex cycles to failure when tested with three different hanging weights (45 g, 50 g and 60 g), were analyzed by a regression technique. The relationships found were as follows:

For the unmodified control fibers (Example B)
No. of cycles to failure = $4.5 \times 10^7 \cdot (\text{stress, g/d})^{4.2}$
For the modified fibers of the invention (Example 6)
No. of cycles to failure = $26 \times 10^7 \cdot (\text{stress, g/d})^{4.8}$ It is seen that the modified fibers of Example 6 show a greater number of flex cycles to failure than the control at stresses up to 20 g/d. At stress levels less than 5 g/d, the modified fibers of Example 6 show two to five times greater flex life than the control.

The following example illustrates the improved dyability of one of the fibers of the invention.

EXAMPLE 26

The fiber designated in Example 14 above was knitted into the form of a cylindrical sleeve. The sleeve was scoured at 70° C. for one hour in a bath consisting of one percent trisodium phosphate and 0.25% Triton ®100 detergent. The fabric was transferred to a dye bath containing 60 grams/liter of sodium acetate, 50 grams/liter of glacial acetic acid and a dye solution consisting of one percent polar blue (acid 80), in a concentration of 1 cm³/gram of fabric. The knitted sleeve was immersed in the dye bath for 15 minutes at 100° C.

Upon removal, the knitted sleeve was found to have become permanently dyed with penetration of the dye stuff into the fiber.

In contrast, it is known that unmodified polyethylene would not be dyed, or to a much lesser degree by this treatment.

We claim:

1. A stretched fiber having tenacity at least 15 g/denier, tensile modulus at least 500 g/denier and main melting temperature at least 140° C., comprising polyethylene of molecular weight at least about 500,000 and a polymeric additive selected from the group consisting of copolymers containing monoolefins as primary monomers, polyolefins of molecular weight not greater than 250,000, oxidized polyolefins and polyoxymethylenes, with the weight of polymeric additive being at least 2% of the weight of the polyethylene.

2. The stretched fiber of claim 1 wherein said polyethylene is of weight average molecular weight at least 1,000,000.

3. The stretched fiber of claim 1 wherein said polymeric additive is an ethylene copolymer.

4. The stretched fiber of claim 3 wherein said ethylene copolymer contains at least one comonomer selected from the group consisting of acrylic acid, methacrylic acid, vinyl acetate and vinyl alcohol.

5. The stretched fiber of claim 3 wherein said ethylene copolymer is an ethylene-acrylic acid copolymer with 1-15 mole percent acrylic acid.

6. The stretched fiber of claim 3 wherein said ethylene copolymer is an ethylene-propylene copolymer.

7. The stretched fiber of claim 3 wherein said ethylene copolymer is an ethylene-propylene-diene terpolymer.

8. The stretched fiber of claim 1 wherein said polymeric additive is a polyolefin of molecular weight not greater than 250,000.

9. The stretched fiber of claim 8 wherein said polymeric additive is low density polyethylene.

10. A composite comprising a network of the stretched fiber of claim 9 and a matrix.

11. The composite of claim 10 wherein said matrix is a polymeric matrix.

12. The composite of claim 11 wherein said polymeric matrix is a thermoplastic matrix.

13. The composite of claim 11 wherein said polymeric matarix is a thermosetting matrix.

14. The composite of claim 11 wherein said polymeric matrix is an elastomeric matrix.

15. The stretched fiber of claim 1 wherein the polyolefin is of molecular weight not greater than 100,000.

* * * * *